(12) United States Patent
Lento et al.

(10) Patent No.: US 9,940,402 B2
(45) Date of Patent: *Apr. 10, 2018

(54) CREATING GROUPS OF USERS IN A SOCIAL NETWORKING SYSTEM

(71) Applicant: Facebook, Inc., Menlo Park, CA (US)

(72) Inventors: Thomas M. Lento, Menlo Park, CA (US); Scott Alex Smith, San Francisco, CA (US); David Edward Braginsky, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,453

(22) Filed: Aug. 19, 2016

(65) Prior Publication Data

US 2016/0357771 A1  Dec. 8, 2016

Related U.S. Application Data

(63) Continuation of application No. 14/517,291, filed on Oct. 17, 2014, now Pat. No. 9,450,993, which is a
(Continued)

(51) Int. Cl.
*G06F 15/16* (2006.01)
*G06F 17/30* (2006.01)
*G06Q 10/10* (2012.01)
*H04L 29/06* (2006.01)
*H04L 29/08* (2006.01)
*G06F 15/173* (2006.01)
*G06F 7/04* (2006.01)
(Continued)

(52) U.S. Cl.
CPC .... *G06F 17/3089* (2013.01); *G06F 17/30598* (2013.01); *G06Q 10/10* (2013.01); *H04L 65/403* (2013.01); *H04L 67/306* (2013.01)

(58) Field of Classification Search
CPC .... G06Q 10/10; H04L 65/403; G06F 17/3089
USPC .................. 709/204, 223; 726/2; 455/435.1; 707/784
See application file for complete search history.

(56) References Cited

U.S. PATENT DOCUMENTS 7,689,682 B1 * 3/2010 Eldering ............... G06Q 40/00
709/218
7,856,449 B1 * 12/2010 Martino ............. G06F 17/3089
707/781
(Continued)

*Primary Examiner* — David Lazaro
*Assistant Examiner* — Vitali Korobov
(74) *Attorney, Agent, or Firm* — Fenwick & West LLP

(57) ABSTRACT

A social networking system facilitates a user's creation of a group of other users from among the user's connections in the user's social network. The created groups may be used, for example, to publish information to certain user-defined groups or to define privacy settings or other access rights to the user's content according to such user-defined groups. When a user adds connections to a group, the social networking system determines suggested connections that have not been added to the group, based on a similarity of the suggested connections with one or more of the connections who have been added to the group. These suggested connections are then presented to the user to facilitate the creation of the group. Both positive and negative feedback may be used to generate a useful set of suggestions, which may be updated as the user further defines the group.

16 Claims, 6 Drawing Sheets

Related U.S. Application Data continuation of application No. 12/751,915, filed on Mar. 31, 2010, now Pat. No. 8,880,600.

(51) Int. Cl.
   *H04W 4/00* (2009.01)
   *G06F 7/00* (2006.01)

(56) References Cited

U.S. PATENT DOCUMENTS

| | | | | | |
|---|---|---|---|---|---|
| 7,885,901 | B2* | 2/2011 | Hull | ............ | G06Q 10/107 |
| | | | | | 705/319 |
| 7,970,827 | B1* | 6/2011 | Cumberbatch | ........ | G06Q 40/00 |
| | | | | | 709/204 |
| 8,880,600 | B2* | 11/2014 | Lento | ............ | G06Q 10/10 |
| | | | | | 455/435.1 |
| 2005/0086211 | A1* | 4/2005 | Mayer | ............ | H04L 51/04 |
| 2008/0120411 | A1* | 5/2008 | Eberle | ............ | G06Q 50/10 |
| | | | | | 709/225 |
| 2009/0070133 | A1* | 3/2009 | Bonilla | ............ | G06Q 50/22 |
| | | | | | 705/1.1 |
| 2009/0320050 | A1* | 12/2009 | Pousti | ............ | G06Q 10/10 |
| | | | | | 719/328 |
| 2009/0328105 | A1* | 12/2009 | Craner | ............ | G06F 17/30997 |
| | | | | | 725/46 |
| 2010/0017431 | A1* | 1/2010 | Schmidt | ............ | G06Q 10/107 |
| | | | | | 707/E17.046 |
| 2010/0125632 | A1* | 5/2010 | Leonard | ............ | G06Q 10/10 |
| | | | | | 709/204 |
| 2010/0281113 | A1* | 11/2010 | Laine | ............ | G06Q 10/10 |
| | | | | | 709/204 |
| 2010/0312724 | A1* | 12/2010 | Pinckney | ............ | G06N 99/005 |
| | | | | | 706/11 |
| 2011/0185020 | A1* | 7/2011 | Ramamurthy | ........ | H04L 67/306 |
| | | | | | 709/204 |

\* cited by examiner

CREATING GROUPS OF USERS IN A SOCIAL NETWORKING SYSTEM

CROSS-REFERENCE TO RELATED APPLICATIONS

This application is a continuation of U.S. application Ser. No. 14/517,291 filed Oct. 17, 2014, which is a continuation of U.S. application Ser. No. 12/751,915 filed Mar. 31, 2010, both of which are incorporated by reference in their entirety.

BACKGROUND

The present invention relates generally to social networking services, and more particularly to facilitating a user's creation of a group of other users from among the user's connections in the user's social network. As used herein, a "user" can be an individual or an entity (such as a business or third party application). The term "connection" refers individuals and entities with which a user of the social networking service may form a connection, association, or other relationship.

Users of social networking services may form connections, associations, or other relationships with other users based on real-life interactions, online interactions, or a mixture of both. For example, users may be from the same geographic location, may travel in the same circle of friends, or may have attended the same college or university. Content posted by a user may be made available to the user's connections via one or more of various communication channels in the social networking system, such as a newsfeed or stream. A user may create a list of connections (also referred to as a "friend list") to prioritize the content available in the newsfeed or stream.

Social networking systems often make use of user-defined groups of connections. For example, a user may wish to publish information to certain user-defined groups of the user's connections in the social networking system, or the user may wish to define privacy settings or other access rights to the user's content according to such user-defined groups. As a user becomes connected with more users in the social networking system over time, mechanisms that allow a user to create groups of the user's connections become highly labor-intensive and often lead to incomplete or smaller lists because of the inherent difficulty in grouping a user's connections. Conventional social networking services lack a connection grouping mechanism that provides users with relevant suggestions for additional connections to add to an existing group of connections. Consequently, users are less likely to take advantage of groups of connections, and the user experience of the social networking service is diminished.

SUMMARY

To enhance the user experience of the social networking service, embodiments of the invention provide suggestions to assist a user when the user is creating a group of the user's existing connections. In one embodiment, after a user has started to create a new group of connections, other existing connections of that user are suggested while the user continues to add connections to the group. The connections to suggest to the user are selected based on their similarity to a common characteristic among the connections that have already been added to the group. The connections in the group may have different types of characteristics, such as age, gender, geographic location, number of common connections with another user, interests, and affinities, just to name a few. The common characteristic is determined, in one embodiment, based on the characteristic having the highest degree of similarity among the users in the new group. The user may then add additional connections to the group from the set of suggested connections or from the user's entire list of connections. As additional connections are added to the group, the social networking system may update the suggestions of connections to add to the group. In this way, the social networking system uses feedback gained during the group creation process to suggest additional connections of the user to add to the group, thereby facilitating the group creation process in a dynamic fashion. As additional connections are added to the group, the system's prediction of the desired group will tend to improve, and the suggested connections will likewise tend to become more relevant.

In another embodiment, the common characteristic is calculated based on both positive and negative feedback of the group. For example, in addition to providing positive feedback by selecting a connection to add to the group, the user may provide negative feedback by expressly indicating that a connection will not be added to the group. In one embodiment, the user interface mechanism that provides the suggested connections also allows the user to ignore or otherwise expressly indicate that a connection (such as a suggested connection) will not be added to the group or is otherwise not relevant to the new group. This negative feedback may be used in the selection process for suggested connections, for example, by identifying one or more characteristics common to the negatively selected connections and avoiding suggesting other connections with a similar characteristic. In this way, both positive and negative feedback from the user may be used to refine the definition of the new group so that more relevant suggestions can be provided.

Figure 1:
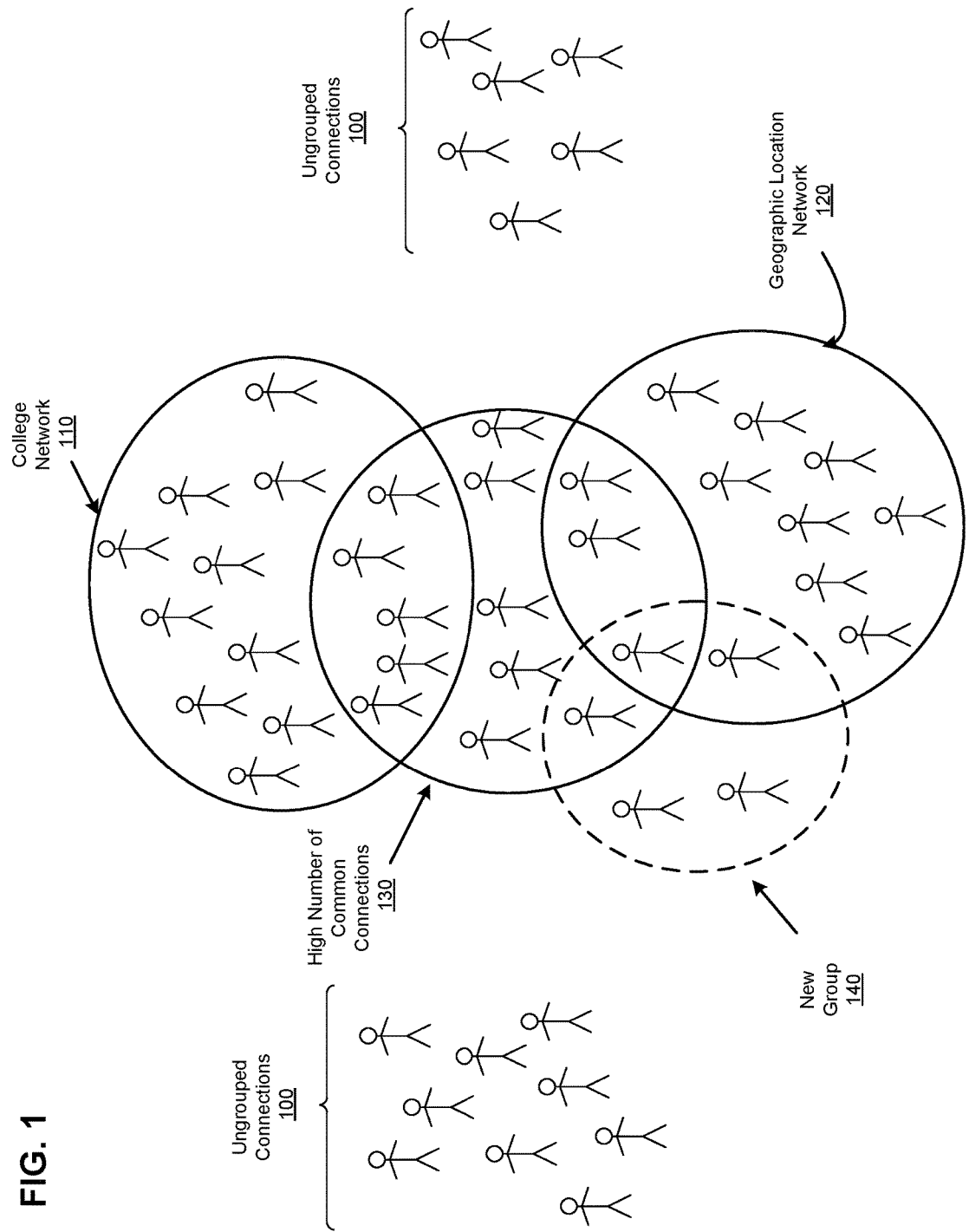
FIG. 1 is a high-level conceptual diagram illustrating connections of a user within various groups, or subsets, in a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System

A social networking system offers its users the ability to communicate and interact with other users of the social networking system. In use, users join the social networking system and then connect with other users, individuals, and entities to whom they desire to be connected. Connections may be added explicitly by a user, for example, the user selecting a particular other user to be a friend, or automatically created by the social networking system based on common characteristics of the users (e.g., users who are alumni of the same educational institution). Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends).

In addition to interactions with other users, the social networking system provides users with the ability to take actions on various types of items supported by the service. These items may include groups or networks (where "networks" here refer not to physical communication networks, but rather social networks of people) to which users of the service may belong, events or calendar entries in which a user might be interested, computer-based applications that a user may use via the service, transactions that allow users to buy or sell items via the service, and interactions with advertisements that a user may perform on or off the social networking system. These are just a few examples of the items upon which a user may act on a social networking system, and many others are possible. Though many of the embodiments and examples provided herein are directed to particular embodiments of a social networking system, other embodiments may include other environments involving different types of social networks, social content, and other types of websites and communication mechanisms.

User generated content enhances the user experience on the social networking system. "Content" may include any type of media content, such as status updates or other textual messages, location information, photos, videos, advertisements, and links. Content "items" represent pieces of content that are represented as objects in the social networking system. In this way, users of a social networking system are encouraged to communicate with each other by "posting" content items of various types of media through various communication channels. Using communication channels, users of a social networking system increase their interaction with each other and engage with the social networking system on a more frequent basis. One type of communication channel is a "stream" in which a user is presented with a series of content items that are posted, uploaded, or otherwise provided to the social networking system from one or more users of the service. The stream may be updated as content items are added to the stream by users. Communication channels of an example social networking system are discussed further in U.S. application Ser. No. 12/253,149, filed Oct. 16, 2008, which is hereby incorporated by reference in its entirety.

However, as a user becomes connected with a large number of other users of the social networking system, the user may wish to view certain users' generated content more often than, or separately from, other users' generated content. For example, a user may have close friends, casual acquaintances, college roommates, co-workers, professional contacts, and family members as connections on the social networking system. Delineating the boundaries between these connections is desirable because the user may wish to view content from close friends and family, for example, before content from professional contacts. It may be difficult, however, for the social networking system to differentiate between professional contacts and close friends. Moreover, a user may be overburdened to manually select connections to a new connection group because of the number of connections on the social networking system that the user has accumulated.

Users may connect for many different reasons on a social networking system. For example, a user's connections in a social network may be grouped by the type of connection shared in real life, such as co-workers, housemates, teammates, classmates, travel companions, relationships, relatives, and random connections. As shown in FIG. 1, however, a user may have many ungrouped connections 100 and only a few grouped connections. A user may create a group of connections that share the same college network 110 or a group that shares the same geographic location 120. Another group may include connections that share a high number of common connections with each other. Each of the connections in these groups have many different characteristics, such as age, gender, affinities, interests, geographic location, college networks, memberships in groups, fan pages, and the like. A user may manually create a new group of connections 140. This new group of connections 140 is a subset of the entire set of the user's connections of the user's social network.

So that the social networking system can provide useful suggestions for the user, the social networking system first predicts the type of group that the user is creating. The group that the user intends to create may be based at least in part on one or more common characteristics of the connections who have already been added to the group. This information may also include profile information provided by the users, and it may also include or otherwise be based on actions performed in connection with the social networking system.

For example, if a user speaks French and starts creating a grouping of connections that also speak French, the social networking system may determine that the common characteristic of the new group is that they are all (or mostly) French speaking. Thus, the system may suggest additional connections that also speak French, as indicated in their profile information, as suggested connections for the new group. In another example, the social networking system may determine that the connections added to the group have a high degree of connectedness within the group (i.e., the connections who have been added are also highly connected to each other). Accordingly, the social networking system may suggest additional connections of the user who themselves are connected to a large number of the user's connections who have been added to the group.

In another example, the social networking system may determine that the common characteristic of the connections that have been added to the group is that the user has a high affinity for the connections. Having a high affinity for another user may indicate a high level of interaction and engagement with that user and the user's posts. Thus, this characteristic may be useful if a user is creating a group of connections with whom the user intends to engage and interact on a regular basis within the social networking system. In another example using affinity, the social networking system may determine that the common characteristic of the connections that have been added to the group is that the connections themselves each have a high affinity for a particular object in the social networking system, such as for another user or entity. Affinities are described further in U.S. application Ser. No. 11/503,093, filed Aug. 11, 2006, which is hereby incorporated by reference in its entirety.

These are just a few examples of different types of groups that the social networking system can predict and assist the user to create.

System Architecture

Figure 2:
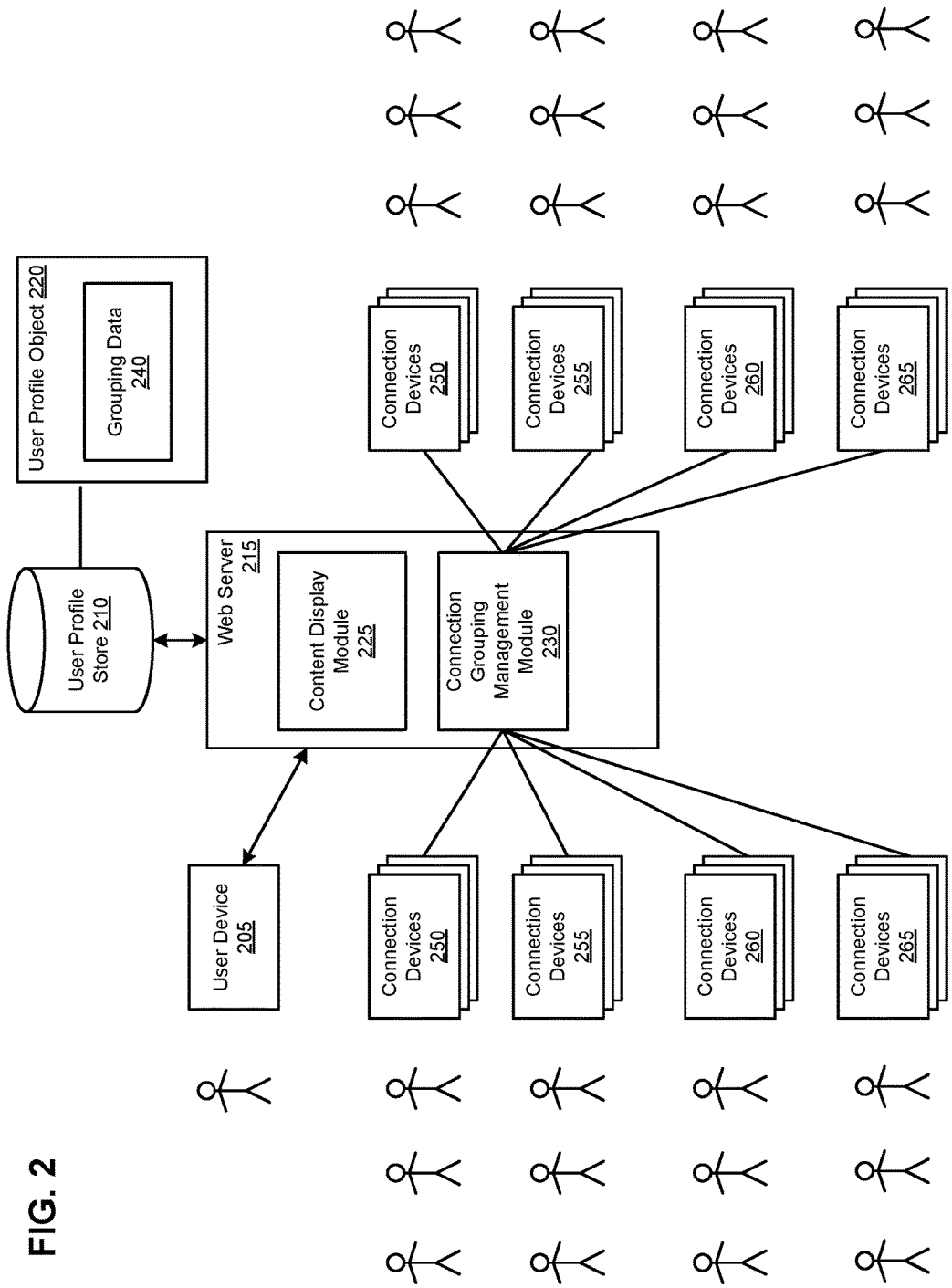
FIG. 2 is a high-level block diagram of a system for creating groups of connections in a social networking system, in accordance with an embodiment of the invention.

FIG. 2, in one embodiment, depicts a high-level block diagram of the system architecture involved in controlling the accessibility of content posted on the social networking system. A user device 205 may include any device that allows a user of a social networking system to interact with other users of the social networking system. The user device 205 communicates with the web server 215 to send and receive data. A user device 205 may request from the web server 215 a web page comprising content items. While accessing the web page, a user may post content to the social networking system via the user device 205 by uploading content. A user profile store 210 communicates with the web server 215 to provide access to a user profile object 220 for each user of the social networking system. The user profile object 220 provides access to grouping data 240 for each user of the social networking system that can be used to generate automatic groupings of connections. The grouping data 240 also comprises user-defined groupings of connections, in one embodiment. In other embodiments, a user device 205 interfaces directly with a web server 215 to upload and receive content items. In another embodiment, the social networking system is implemented on an application running on a client device (e.g., a portable communications device) that accesses information from the social networking system using APIs or other communication mechanisms.

The web server 215 comprises a content display module 225 and a connection grouping management module 230. The content display module 225 displays a content item uploaded by a connection via a connection device 250, 255, 260, or 265 and identifies an object on the social networking system associated with the uploaded content item. The connection grouping management module 230 provides an interface for the user to create and edit groupings of connections. This interface also provides suggested connections based on the connections already selected in the grouping. The connection grouping management module 230 includes a user interface module to perform this functionality.

The connection grouping management module 230 also retrieves grouping data 240 from the user profile object 220 associated with the connection uploading the content via the connection device 250, 255, 260, or 265. Using the grouping data 240, the connection grouping management module 230 determines common characteristics of the new grouping created by the user, as described in more detail below.

Connection devices 250, 255, 260, and 265 represent different devices used by groups of connections made up of individuals, entities, or both. The connection grouping management module 230 receives a content item from a connection device 250, 255, 260 or 265 and determines the grouping(s) of the connection associated with the device according to the selected groupings stored as grouping data 240. For example, connection devices 250 may relate to devices used by a user's relatives, while connection devices 255, 260, and 265 may relate to devices used by a user's classmates, coworkers, or other relationships.

Connection Grouping Management

Figure 3:
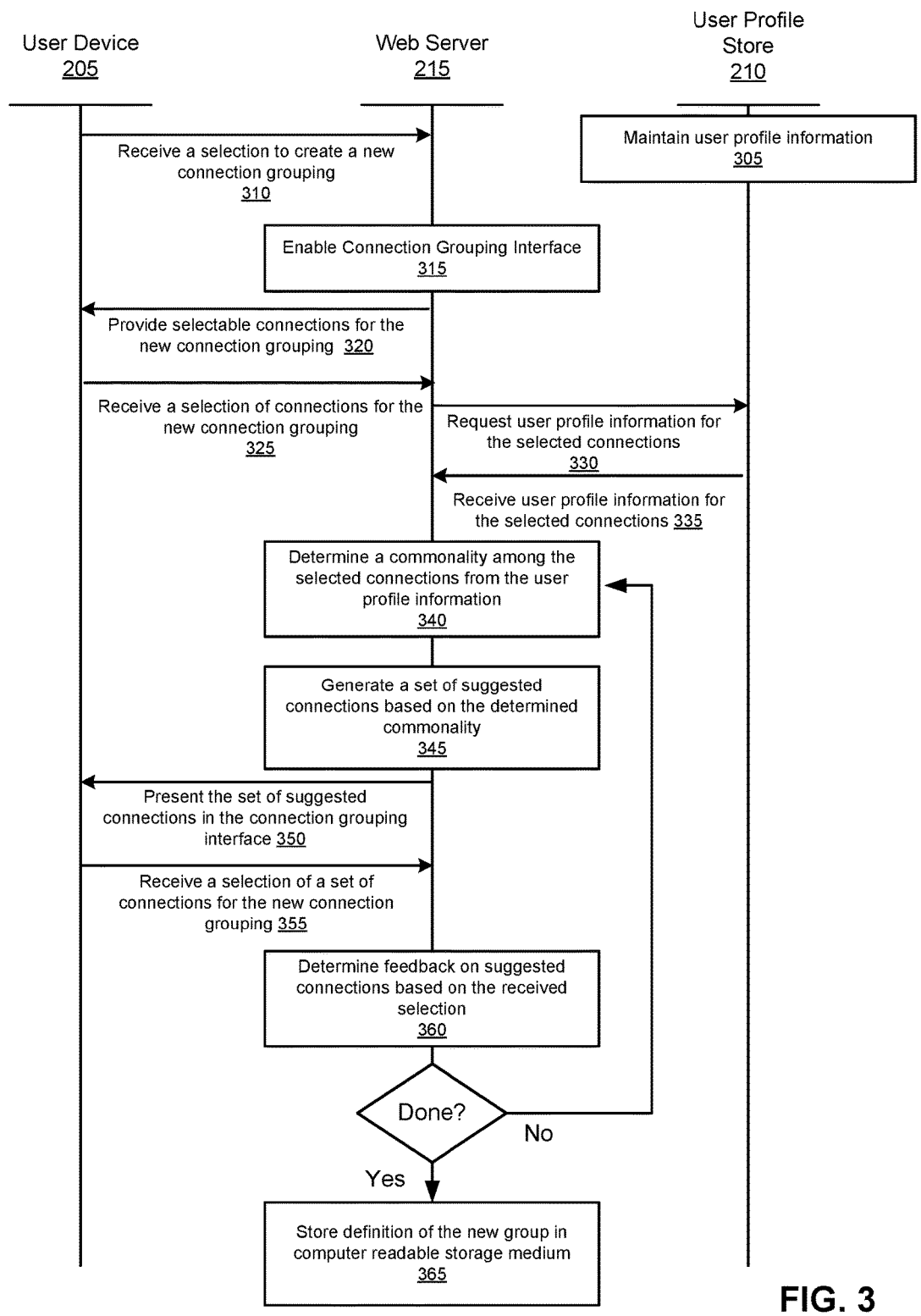
FIG. 3 is an interaction diagram of a process for providing suggested connections based on a common characteristic of a new connection grouping, in accordance with an embodiment of the invention.

FIG. 3 is an interaction diagram showing how a user may create a new group from the user's connections in the social networking system. As discussed earlier, a user's profile information is maintained 305 in the user profile store 210 as a user profile object 220 comprising, among other things, grouping data 240.

The web server 215 receives 310 a selection to create a new group of the user's connections from the user device 205. The web server 215 enables 315 a user interface loaded with the user's profile information to manage the grouping of connections. The web server 215 responds to the request by providing 320 the user device 205 a web page that contains a user interface including a list of the user's connections. The user interface allows the user to select connections from the list to add to the group using the user device 205. The user device 205 sends 325 the user's selection of connections for the new group to the web server 215.

User profile information is requested 330 from the user profile store 210 for the selected connections. This user profile information may include demographic information, express interests, a list of the connection's own connections, networks or groups to which the connection belongs, the connection's affinities for various objects, the user's affinity for the connection, the geo-location of the connection, the type of device (e.g., mobile) that the connection is currently using or last used, the date or time, and any other social contextual information (e.g., birthdays, events, holidays or the like) that may be relevant for grouping a set of connections. The user profile information is then received 335 from the user profile store 210 for the selected connections. This user profile information may also include information about the connection that is computed rather than stored. For example, a connection's affinity for a particular user or other object in the social networking system may be computed rather than stored.

Using the received profile information about the selected connections, at least one common characteristic among the selected connections is determined 340. For example, a common characteristic of the selected connections may be that they are all male, or that they share at least two friends in common, or that the user has at least a threshold level of affinity for each connection. The common characteristic may be defined as the characteristic shared by a majority of the selected connections. Or, in another example, a common characteristic is absolutely shared by the entire set of selected connections. The common characteristic used by the social networking system may be a predetermined characteristic, such as the number of friends in common with the other added connections. Alternatively, the common characteristic may be dynamically defined based on which characteristic, or which set of characteristics, has the highest degree of similarity amongst the selected connections. As such, the common characteristic of the selected connections may be defined in various ways, yet the common characteristic is descriptive of each of the selected connections. Embodiments for determining the common characteristic are described in more detail in the following section. The determined common characteristic is then used to generate 345 a set of suggested connections.

The set of suggested connections received from the web server 215 is presented 350 to the user in a user interface via the user device 205. The user may make a selection of one or more additional connections to add to the group, either from the main list of connections or from the provided list of suggested connections to add to the group. The user's selection is received 355 by the user device 205. The selection may include a rejection of a suggested connection, a selection of a new connection independent from the suggested connections, or an acceptance of a suggested connection. A user's feedback about the suggested connections may be determined 360 based on the user's selection. The acceptance of a suggested connection provides express positive feedback, while the rejection of a suggested connection provides express negative feedback.

In one embodiment, the selection of one or more connections that were not suggested connections is used as neutral feedback. The reasoning behind this is that the user did not directly respond to a suggested connection. In another embodiment, this selection of a new connection independent from the suggested connections provides negative feedback because the user has implicitly rejected the suggested connections in ignoring the suggested connections.

The selection may also include an indication that the user ignored or otherwise expressly indicated that one or more of the connections (either in the main list of connections or in the list of suggested connections) are not relevant to the group that the user is creating. This indication also provides negative feedback to the social networking system. In one embodiment, the negative feedback for ignoring a suggested connection may be less than the negative feedback for expressly rejecting a suggested connection. The positive and negative feedback may be used by the social networking system to refine the identification of suggested connections provided to the user, as further discussed below.

When the user indicates that the user is done adding creating the new connection grouping (e.g., by pressing a "save group" button), the definition of the new group is stored 365 in a computer readable storage medium, such as in a record associated with the user's profile in the social networking system. On the other hand, the user may indicate that the user is not done adding connections to the new connection grouping by continuing to select connections from the user interface, reject suggested connections, or accept suggestions. While the user has not indicated that the user is done adding connections, the process repeats at step 340 in which a common characteristic of the selected connections is determined 340, including the newly selected connections. As a result, the determination of a common characteristic incorporates the newly selected connections, providing additional information to the social networking system in the form of positive and negative feedback to refine the suggestions provided to the user. This information is retrieved from the user profile information for each of the newly selected connections. Thus, the suggestions provided to the user become more relevant through this process of gathering information about the selected connections.

Determination of a Common Characteristic and Identification of Suggested Connections The determination of commonality, a common, or correlated, characteristic among the selected connections may be based on various techniques. In one embodiment, a common characteristic may be fixed and predetermined by the social networking system. For example, the social networking system may evaluate each of the user's connections not already added in the group and select the connections that have the highest number of friends already in the group. In doing so, the provided suggestions represent "friends of friends," or connections that may travel in the same social circles. Thus, the common characteristic is simple because an evaluation of the new group of selected connections is not needed to make the determination. The common characteristic may be fixed by the social networking system in that the common characteristic does not change in response to feedback received from the user.

Another simple characteristic that may describe the selected connections is the rates of interactions with the social networking system. A user may have selected connections with above average rates of interactions with the social networking system, meaning that the selected connections interact with the social networking system at a rate that is above average for the social networking system. This would indicate active users of the social networking system. In this case, the suggested connections would include connections that have not been added to the group that have above average rates of interactions with the social networking system. In one embodiment, a predetermined threshold rate of interaction may be configured by the administrators of the social networking system. If the selected connections have rates of interaction that are higher than the threshold, then the social networking system may determine that this characteristic should be used to suggest connections for the group to the user.

More complex characteristics of the selected connections, such as similar age group, common membership in geographic and college networks, and common interests and affinities, may be used to dynamically determine the common characteristic of the new group. For each of the selected connections in the group, profile information is maintained in a database that identifies the complex characteristics of the connection. The records for the selected connections in the group may be joined to determine which complex characteristics are shared among the entire set of selected connections. One or more characteristics may be shared among the selected connections, or no single characteristic may be shared among all of the selected connections. This determination of a common characteristic is more complex because an evaluation of the entire set of selected connection must be made. Additionally, the dynamic nature of the determination means that the common characteristic may change based on the feedback received from the user and the newly added connections.

To determine the common characteristic of the new group in the instance where no single characteristic is shared among the selected connections, the characteristic that is shared by the highest number of selected connections may be selected as the common characteristic for the new group. Otherwise, the one or more characteristics shared by the selected connections may be used as the common characteristic, alone or in combination. For example, the selected connections may share three characteristics: males aged 18-25 with "music" listed in their interests. These characteristics may be contained in the connections' profile information. In one embodiment, the determined common characteristic for the group is a combination of the three characteristics. Thus, the social networking system would select the connections not already in the new group that have all three characteristics.

Alternatively, the determined common characteristic may be defined to select a subset of the shared characteristics. The selection of the subset may be based on weights, configured by administrators of the social networking system, on certain complex characteristics that have been identified as being correlated to the user's interests. Predetermined weights for certain characteristics may indicate degrees of relevance to the user based on the user's interactions with objects on the social networking system. For example, user profile information may include affinity scores for other users and/or objects or other things, entities, interests, concepts, or other objects in the social networking system. A user may have a high affinity score for football. If one of the shared characteristics of the selected connections were football, this characteristic may outweigh the other matching characteristics. Thus, shared characteristics may be ranked based on these weights, such as an affinity score, configured by administrators of the social networking system.

The selection of the subset may also be based in part on maximizing computational efficiency while providing relevant suggestions to the user. With hundreds of millions of users of a social networking system, the computational costs for evaluating each user's connections may be expensive in terms of processing power. Achieving the optimal balance for each user involves gathering more data about how the user creates new groups in the form of positive and negative feedback. By incorporating the user's feedback into the determination of the common characteristic, as described above, the social networking system is able to learn the characteristics that are more relevant than others to the user. In this way, the social networking system may subsequently rank the shared characteristics based on the feedback. As a result, the social networking system can provide more relevant suggestions of connections to add to a new group as more groups are created by the user while also maximizing computational efficiency.

As an example, the initial determination of the common characteristic of a new connection grouping may be that the selected connections are male and between the ages of 26-35. Suggested connections may include another male that is in the same age group as well as a female in the same age group. If the female is accepted, then the determination of the common characteristic may change to depend on just the age group. However, as more connections are added to the new connection grouping, the common characteristic may adaptively change to the most common characteristic shared by most of the connections. Thus, a ranking of the shared common characteristics of the connections may be used to select the most common characteristic.

As described above, one characteristic of a group may be that the selected connections are highly connected with each other, meaning that a threshold number of the selected connections are directly connected with the other selected connections. The threshold may be predetermined by the administrator of the social networking system or may be calculated based on the average number of connections that are connected with the other selected connections. The social networking system may identify this characteristic by counting the number of direct connections between the selected connections. Once this characteristic of highly connectedness between the selected connections has been identified, suggestions may be generated by counting the number of direct connections between the selected connections and connections who have not been added to the group, ranking these connections by the count, and selecting the connections with the highest counts. Similarly, the number of common networks shared between the selected connections may be counted to rank the selected connections.

In another embodiment, the determination is initially fixed at a certain characteristic, such as an age group until more connections are selected to provide more information to verify the initial characteristic as the definition of the new group. The accuracy of the initial fixed characteristic is verified by analyzing the feedback provided by the user in accepting, rejecting, or ignoring a suggested connection. If the initial characteristic accurately describes the new group, then the user is expected to accept the suggested connection based on the initial characteristic, providing positive feedback. However, if the initial characteristic does not accurately describe the new group, then the user may reject or ignore a suggested combination, providing negative feedback. As a result, the initial characteristic may be a positive predictor or a negative predictor of an accurate characteristic that describes the new group, based on whether the feedback received from the user in response to the suggested connection was positive or negative.

Different types of distributions apply to different characteristics of users in the social networking system, such as a normal distribution (i.e., a bell curve distribution), as well as other well known distributions (e.g., log-normal, binomial). A best fit analysis may be performed to determine the appropriate distribution for each characteristic across the users of the social networking system. This enables the social networking system to assign characteristics of users to the appropriate distribution for statistical analysis. Information about the user's connections is analyzed to determine local parameters (e.g., 70% of this user's connections are male). Then, appropriate statistical tests (e.g., t-test, chi-square test, binomial test) are used to determine the probability of a characteristic arising if the connections in the group were selected randomly. For example, if 70% of a user's connections are male, then the probability of randomly selecting a group of 5 female connections is about 2.5%. Finally, the positive and/or negative predictors may be weighed based on their likelihood, e.g., the probability of randomly selecting a group exhibiting a shared characteristic.

As mentioned above, the selected connections of a new group may share multiple characteristics. One of the shared characteristics may be designated as a positive predictor because of the user's feedback in response to suggested connections. The positive predictor may be defined as the average characteristic of the selected connections. An average is used to define an expected value of the characteristic. For example, a positive predictor may be defined as the characteristic of a group of selected connections with an average age of 27. Thus, connections that have not been added to the group that are within one standard deviation of age 27 may be selected as suggested connections. If the characteristic is a non-numeric value, such as geographic location or gender, the characteristic may be transformed into a number from the set $\{0, 1\}$, where the value of 1 indicates the presence of the characteristic.

The positive predictor may change based on the feedback received from the user and the connections being added to the group. For characteristics that are normally distributed, the standard deviation of the group may be examined to determine whether the common characteristic for the group should be changed. If the standard deviation of the group becomes larger than the standard deviations of other characteristics shared by the group, then the shared characteristic with the smallest standard deviation may be selected as the common characteristic for the group. A small standard deviation for a shared characteristic indicates that the expected value, or average, of the characteristic shared by most of the selected connections, thus indicating a stronger correlation than a shared characteristic with a larger standard deviation. The comparison of averages and standard deviations for two groups is known as a t-test. Here, the average and standard deviation of the positive predictor is compared to another shared characteristic of the group. An ANOVA, a series of t-tests, may be used to analyze multiple groups to determine if there is a variance amongst the groups. Post-hoc analysis may be used to determine the actual variances between the groups. In sum, the positive predictor may change based on the standard deviation of the shared characteristics of the group.

Negative predictors may also be tracked by the social networking system. If a user expressly rejects a suggested connection, at least one characteristic of the rejected suggested connection is a negative predictor. A negative predictor may be defined as the average of a characteristic that has been expressly rejected by a user. Using a t-test, or a series of t-tests, to compare the standard deviations of negative predictors, strong negative predictors may be identified as having the smallest standard deviations. For example, if the user consistently rejects suggested connections that have a high affinity for sports, then this characteristic may be used as a strong negative predictor.

A score may be used to evaluate connections that have not already been added to the new group. In one embodiment, the score may rely solely on the value of the positive predictor for each connection. In another embodiment, the score may rely on both the positive predictor and strong negative predictors, as discussed above. A potential suggested connection may be evaluated using a score that evaluates whether the potential suggested connection is an outlier from the positive and negative predictors. An outlier is a value that is numerically distinct from the rest of the data. A value that is within one standard deviation, for example, is not an outlier.

The distance, or numerical difference, from the positive predictor, or the average of the common characteristic, should be small to achieve a higher score for characteristics that are normally distributed. In other words, the similarity value of the characteristic for the potential suggested connection to the positive predictor is directly proportional to the score. One function for scoring the positive predictor is $f(x_i)=|(1/(avg(x)-x_i))|$. Similarly, if the distance from the negative predictor is small, then a larger penalty should be assessed. One function for scoring the negative predictor is $g(y_i)=|(1/(avg(y)-x_i))|$. Thus, a score to rank potential suggested connections can be defined as $S=f(x_i)-g(y_i)$. Weighting parameters ($\alpha$, $\beta$) may be used by the social networking system to adjust the effects of positive and negative feedback on the score, for example, so that the score may be defined as $S=\alpha*f(x_i)-(\beta*g(y_i))$.

Other functions for scoring positive and negative predictors may also be formulated for characteristics that are not normally distributed. Returning to the example above, in which a group of 5 female connections was selected by a user, even though 70% of the user's connections are male, a p value may be determined for each characteristic of the user's connections. The gender characteristic's p value, in this example, would be 2.5%, meaning that the probability that the group of 5 female connections was selected by chance is 2.5%. The probability that the characteristic is being intentionally chosen by the user may be calculated by a proxy, 1−p. In this case, the probability that the user intentionally selected 5 female connections is 97.5%. The probability that a group member belongs in the group may also be calculated, e.g., 0% for male group members, assuming that the gender characteristic is important. From this, the probability that a connection should be excluded from a group based on a certain characteristic, e.g., the probability that males should be excluded, by taking the product of the proxies of the characteristics' p values, or 97.5%*100%, assuming that the characteristics are independent. As a result, the user's connections may be ordered according to these calculated probabilities.

In addition, a machine learning model may be implemented "on the fly" to train on the social networking system. The machine learning model may characterize connections that have been already added to the group as positive examples and characterize suggested connections that have been rejected or ignored by the user as negative examples in its training to identify the common characteristic of the group. Along with highly-ranked suggested connections, the machine learning model may randomly assign a small number of the user's other connections as suggestions. Predictions from this model could then be used to rank the user's remaining connections.

Combining the examples above, assume that the positive predictor for a group is an average age of 27 and that the negative predictor is a high affinity for sports. Thus, if one potential suggested connection is aged 27 but has a high affinity for sports, the score would be lower than a potential suggested connection that did not have a high affinity for sports. In other words, the score is defined as the value of the positive predictor for the potential suggested connection hedged by the value of the negative predictor(s). The score can then be used to rank the potential suggested connections. The connections with the highest scores are selected as suggested connections.

A chi-square test can be used to test the goodness of the fit of a model, where the expectations of a predictive statistical model are tested against the actual feedback received from the user. Here, we have assumed that the distributions of the characteristics of users on the social networking system follow a standard t-distribution, or bell curve distribution such that the positive and negative predictors may be used to score potential suggested connections. The actual feedback received from the user may be used to determine whether the distribution for a predictor is a good fit for the received data.

Suppose that the common characteristic of the new connection grouping is that the selected connections are between the ages of 26-32 and that the average age is 30. If the user selects several connections in a drastically different age group, such as the parents and grandparents of one of the selected connections who are in their 50s and 70s, these selections may indicate that the initial characteristic may be incorrect. A chi-square test on the positive predictor for the group, the age characteristic, may be used to determine that the age characteristic does not follow a standard t-distribution. As a result, the t-tests described above should not be applied to this characteristic for this group. This affects how the social networking system may interpret the feedback received.

User Interface

Figure 4A:
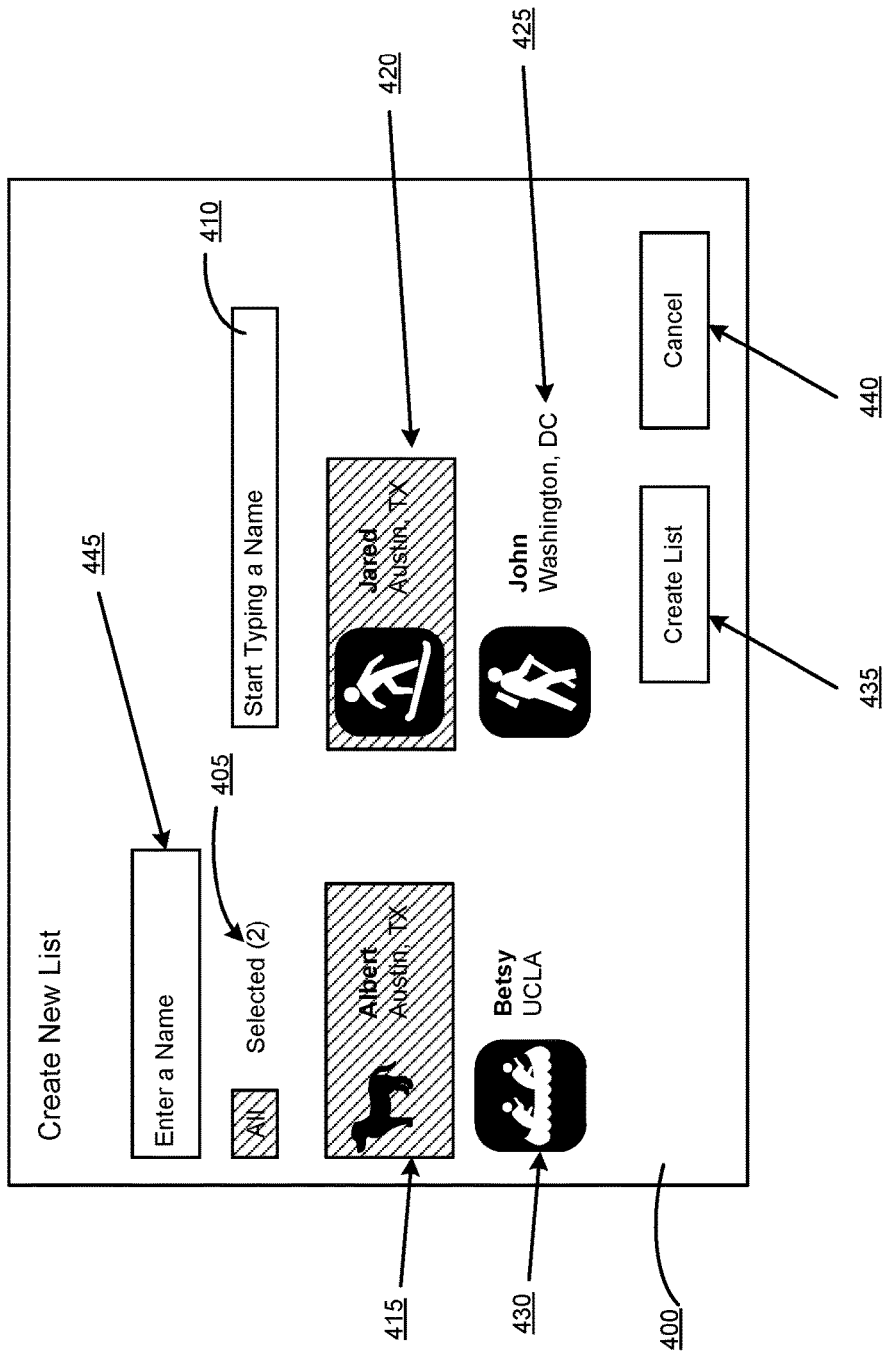
FIGS. 4A-C are screenshots of an interface for suggesting connections when a user is creating a new group, in accordance with an embodiment of the invention.
Figure 4B:
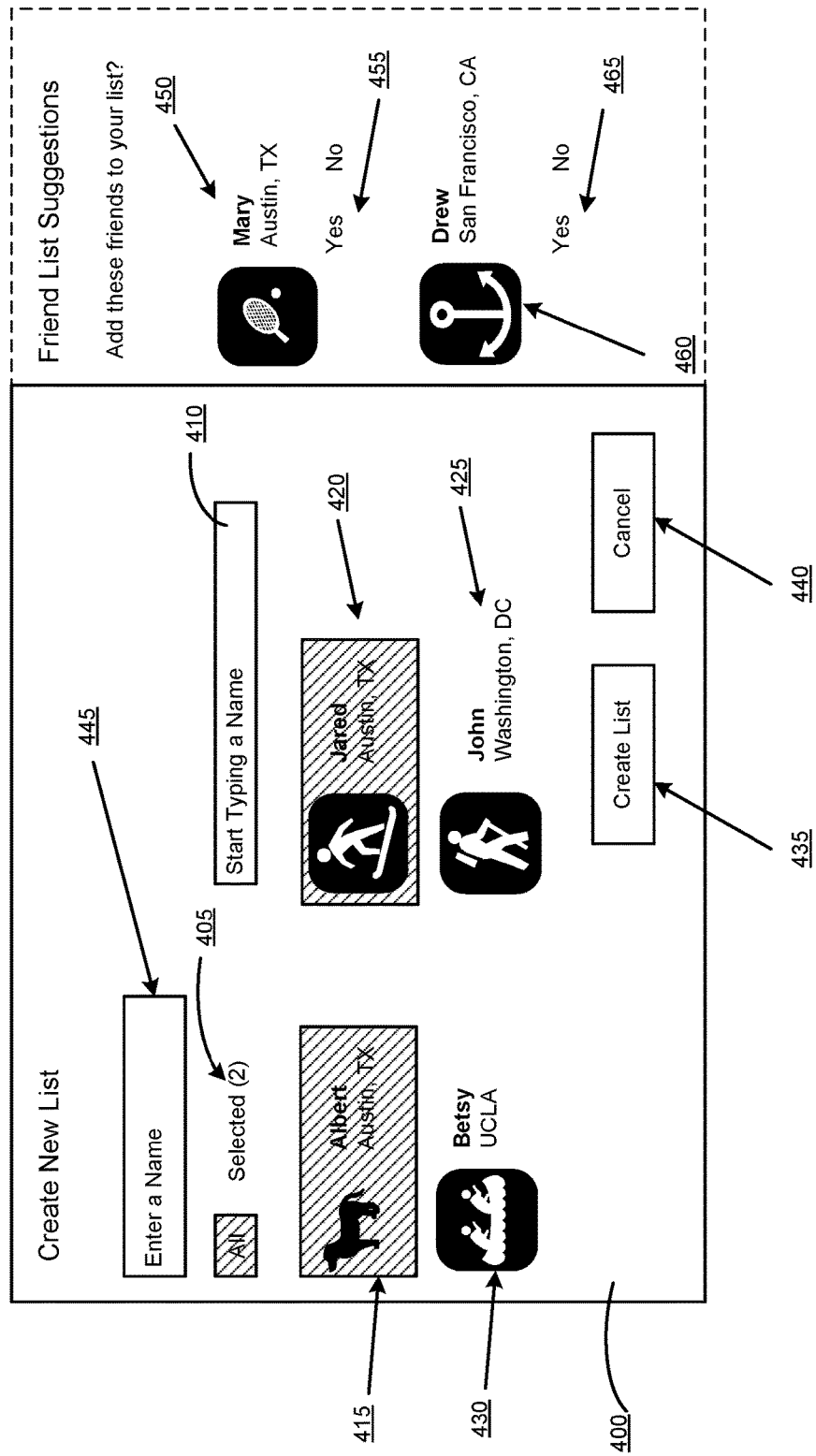
Figure 4C:
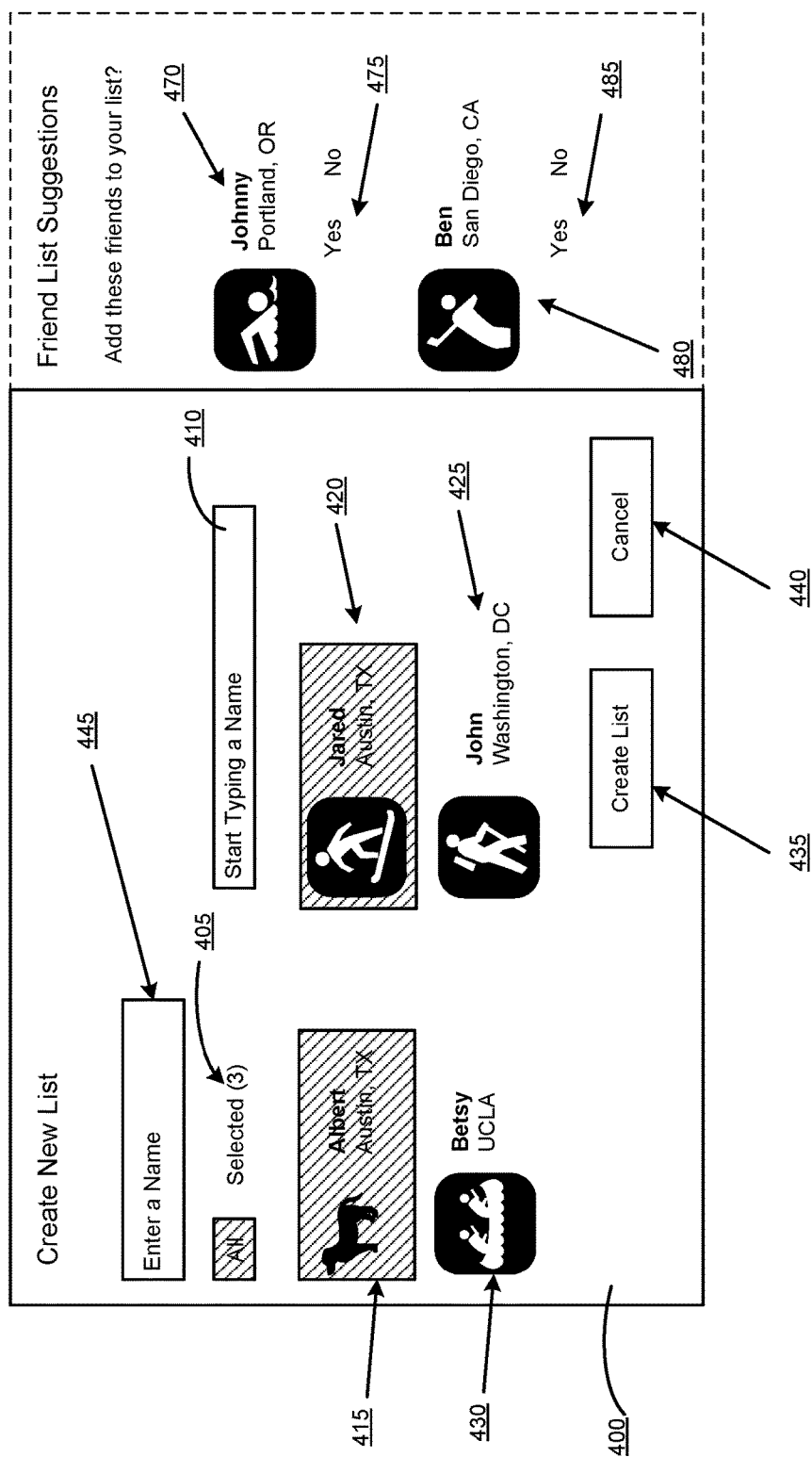

FIGS. 4A-C are screenshots of one embodiment of the invention. FIG. 4A displays a dialog sent by a web server 215 that includes an interface 400 allowing a user to create a group of the user's connections in a social networking system. A user may add to the new group by manually selecting graphical images of connections, such as connections 415, 420, 425, and 430, or by typing names of connections in an input field 410. As illustrated, two connections have already been selected 405 and are shaded 415 and 420. Both of the selected connections 415 and 420 are males from Austin, Tex. After the user is finished selecting connections, a button 435 to create the list is provided to store the definition of the connection grouping. The user may also select a button 440 to cancel the creation of the new connection grouping. Using an input field 445, the user may also name the connection grouping.

As illustrated in FIG. 4B, the connection grouping interface 400 has expanded to provide the user with "Friend List Suggestions," or suggested connections based on the characteristics of the selected connections. Here, the user is presented with two connections 450 and 460. The first connection 450 is Mary from Austin, Tex., while the second connection 460 is Drew from San Francisco, Calif. The user is also asked whether to add these connections to the new connection grouping and may select "Yes" or "No" under each of the suggested connections using the selectable links 455 and 465.

In FIG. 4C, the connection grouping interface 400 has adaptively changed the suggested connections based on the feedback provided by the user. Although not shown, it is indicated 405 that the user has selected an additional connection for the new connection grouping. For illustration purposes, let us assume that Drew from San Francisco, Calif. was selected. This connection is another male, but the geographic location of the connection is not the same as the previously selected connection 415 and 420. Thus, new suggested connections 470 and 480 have been provided to the user from the different geographic locations. The user may select links 475 or 485 beneath the suggested connections to indicate whether to add or reject the connections from the new connection grouping. These new suggested connections 470 and 480 may be based on other characteristics of the selected connections, such as affinities, interests, common friends, and the like.

In another embodiment, suggested connections may also include other users of the social networking system that are not directly connected to the user, but that are highly likely to be known by the user based on the user's connections. By incorporating these indirect connections into the pool of suggested connections, the social networking system enables the user to build and grow his or her network of users. In yet another embodiment, suggested connections may also include entities that exist outside of the social networking system. For example, a third party entity may be suggested by the social networking system to be added as part of the new connection grouping. In this way, the user may be presented with new entities that may have been previously unknown to the user.

Implications of Connection Grouping Management

As a result of improved connection grouping management, users are encouraged to make more groups of their connections, which may in turn enhance the user's ability to take advantage of various features of the social networking system. For example, a user may wish to publish content to certain connection groups, or restrict access to content based on the connection groups. Further, the groups will likely be more accurate and complete because the common characteristic of each group will have been refined through the process of receiving user feedback regarding suggested connections and the use of statistical tools to verify the positive and negative predictors.

Furthermore, the communication channels that shape the user's experience with a typical social networking system are made to be a better reflection of what a user is interested in seeing. The user experience would be less disrupted if the social networking system were to compel the user to create certain groupings (such as "family" or "top friends").

The creation of these groups of connections also improves the social networking system's understanding of relationship data throughout the social graph of the connections on the social networking system. Such understanding may have direct impacts on potential revenue streams because it enables the targeting of certain demographics (i.e., mothers) and provides better predictions of when users are likely to respond to social suggestions or calls to action.

Because connection grouping management is tailored for each user, the user's experience on the social networking system is improved dramatically by helping the user to organize the information presented by the numerous connections accumulated on the social networking system, as well as in real life. By automating the process of understanding and analyzing the boundaries of different circles of friends, connection grouping management helps to simplify the user experience by efficiently managing information flow.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system comprising:
 a computer processor; and
 a computer-readable storage medium coupled to the computer processor, the computer-readable storage medium storing executable code, the code when executed by the computer processor performs steps comprising:

storing a user profile for a user of a social networking system, the user having one or more connections, where each connection is another user of the social networking system with whom the user has established a relationship, receiving from the user an indication to add a connection of the user to a group of connections of the user, determining one or more common characteristics between two or more of the connections in the group, determining one or more additional connections from the one or more connections in the user profile who are not in the group to suggest based on the one or more common characteristics, and suggesting to the user to add the one or more additional connections to the group.

2. The system of claim 1, wherein the one or more common characteristics include a first common characteristic and a second common characteristic, and determining one or more additional connections from the one or more connections in the user profile to suggest based on the one or more common characteristics, further comprises:

identifying a first connection having the first common characteristic and not the second common characteristic as an additional connection of the one or more additional connections.

3. The system of claim 2, wherein the code when executed by the computer processor further performs steps comprising:

receiving from the user an indication to add the first connection to the group; and adaptively changing the one or more common characteristics to a different characteristic based on the indication.

4. The system of claim 1, wherein determining one or more common characteristics between two or more of the connections in the group comprises:

determining that no single characteristic is common to all connections in the group.

5. The system of claim 4, wherein the code when executed by the computer processor further performs steps comprising:

identifying one or more characteristics that are shared by the highest number of connections in the group; and identifying the one or more common characteristics as the identified one or more characteristics.

6. The system of claim 1, wherein the one or more common characteristics include a characteristic that indicates the user and the connections in the group interact with the social networking system at a rate that is above average for the social networking system.

7. The system of claim 1, wherein determining one or more common characteristics between two or more of the connections in the group comprises:

identifying a positive predictor based on a characteristic having a low variation among the connections that have been added to the group;

computing a score using the positive predictor for a plurality of candidate connections that have not been added to the group; and choosing the one or more suggested connections based at least in part on the scores for the candidate connections.

8. The system of claim 7, wherein the code when executed by the computer processor further performs steps comprising:

identifying a positive predictor based on a characteristic having a high variation among the connections that have been added to the group, wherein the score is further computed using the negative predictor.

9. The system of claim 7, further comprising:

receiving an indication from the user not to add a particular connection to the group; and identifying a negative predictor based on a characteristic of the particular connection that the user indicated not to add to the group, wherein the score is further computed using the negative predictor.

10. The system of claim 7, wherein the score is directly proportional to a similarity value of a characteristic for a candidate connection to the positive predictor.

11. A system comprising:

a computer processor; and a computer-readable storage medium coupled to the computer processor, the computer-readable storage medium storing executable code, the code when executed by the computer processor performs steps comprising:

receiving from a user of a social networking system an indication to add a connection of the user to a group of connections of the user, wherein the user has one or more connections and each connection is another user of the social networking system with whom the user has an established a relationship, determining one or more common characteristics between two or more of the connections in the group, determining one or more additional connections from the one or more connections in the user profile who are not in the group to suggest based on the one or more common characteristics, and suggesting to the user to add the one or more additional connections to the group.

12. The system of claim 11, wherein the one or more common characteristics include a first common characteristic and a second common characteristic, and determining one or more additional connections from the one or more connections in the user profile to suggest based on the one or more common characteristics, further comprises:

identifying a first connection having the first common characteristic and not the second common characteristic as an additional connection of the one or more additional connections.

13. The system of claim 12, wherein the code when executed by the computer processor further performs steps comprising:

receiving from the user an indication to add the first connection to the group; and adaptively changing the one or more common characteristics to a different characteristic based on the indication.

14. The system of claim 11, wherein determining one or more common characteristics between two or more of the connections in the group comprises:

determining that no single characteristic is common to all connections in the group.

15. The system of claim 14, wherein the code when executed by the computer processor further performs steps comprising:

identifying one or more characteristics that are shared by the highest number of connections in the group; and identifying the one or more common characteristics as the identified characteristics.

16. The system of claim 11, wherein the one or more common characteristics include a characteristic that indicates the user and the connections in the group interact with the social networking system at a rate that is above average for the social networking system.

\* \* \* \* \*

UNITED STATES PATENT AND TRADEMARK OFFICE
CERTIFICATE OF CORRECTION

PATENT NO. : 9,940,402 B2
APPLICATION NO. : 15/241453
DATED : April 10, 2018
INVENTOR(S) : Thomas M. Lento et al.

It is certified that error appears in the above-identified patent and that said Letters Patent is hereby corrected as shown below:

In the Claims

Column 16, Line 26, after ""established" delete "a".

Signed and Sealed this
Fourth Day of June, 2019

Andrei Iancu
*Director of the United States Patent and Trademark Office*